E. A. ARP

May 16, 1933. TOOL ATTACHMENT DEVICE Re. 18,832

Original Filed Oct. 15, 1930 4 Sheets-Sheet 1

Ewald A. Arp
INVENTOR

May 16, 1933.

E. A. ARP

TOOL ATTACHMENT DEVICE

Re. 18,832

Original Filed Oct. 15, 1930 4 Sheets-Sheet 2

Ewald A. Arp
INVENTOR

E. A. ARP

May 16, 1933. TOOL ATTACHMENT DEVICE Re. 18,832

Original Filed Oct. 15, 1930 4 Sheets-Sheet 3

Everett A. Arp
INVENTOR

E. A. ARP
May 16, 1933. TOOL ATTACHMENT DEVICE Re. 18,832
Original Filed Oct. 15, 1930 4 Sheets-Sheet 4
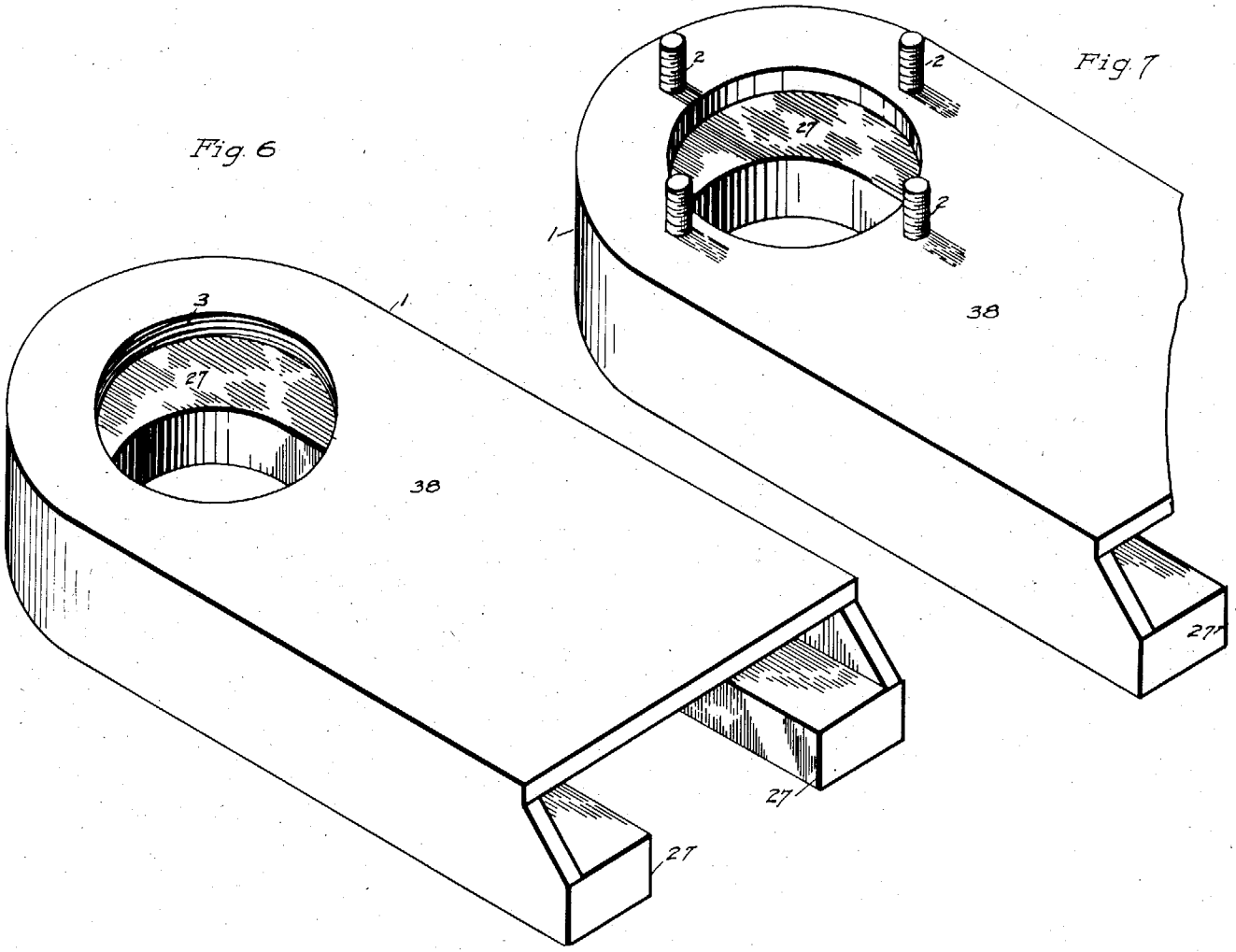
Ewald A. Arp
INVENTOR Reissued May 16, 1933

Re. 18,832

UNITED STATES PATENT OFFICE

EWALD A. ARP, OF MINNEAPOLIS, MINNESOTA, ASSIGNOR TO VAN NORMAN MACHINE TOOL COMPANY, OF SPRINGFIELD, MASSACHUSETTS, A CORPORATION

TOOL ATTACHMENT DEVICE

Original No. 1,881,993, dated October 11, 1932, Serial No. 489,004, filed October 15, 1930. Application for reissue filed November 16, 1932. Serial No. 642,866.

This invention I designate a tool attachment device. It relates to the art of attaching portable cutting or finishing tools having a rotary motion, or the motors, centering devices, or other appurtenances of such tools to the machine part on which such work is to be performed. In its preferred application the device will serve as a machine base for attaching cylinder boring or finishing tools to the engine block of multiple cylinder engines.

The complete device comprises the following parts: (*a*) a combination of parts so arranged that they form an extensible and adjustable arm which is inserted into one of the cylinders of the engine block, but not into the cylinder on which work is to be done; (*b*) an extensible and adjustable engaging device rotatably attached to the above arm and arranged so that it will engage the end of the cylinder; (*c*) an extensible adjusting device mounted near the upper end of the arm; (*d*) a sliding machine base securely clamped to the arm and constructed to give firm support to the working or finishing tool without distortion of the cylinder upon which the work is to be performed.

In the accompanying drawings I have illustrated a practical embodiment of this invention, and the following description thereof will enable others skilled in the art to adapt and use the invention; but I do not consider the invention restricted to the particular form or construction of parts shown in the drawings, as various modifications and changes may be made by skilled mechanics or engineers while retaining the essential novel characteristics of the invention. Therefore, I refer to the claims for summaries of the essentials of the invention and novel features of construction and novel combinations of parts, for all of which protection is desired.

In the drawings, parts which are well known are merely conventionally illustrated. In said drawings:

Figure 6 is a view of the main member of the sliding machine base; and

Figure 7 is another view of the main member of the sliding machine base, showing an alternative construction.

Figure 1:
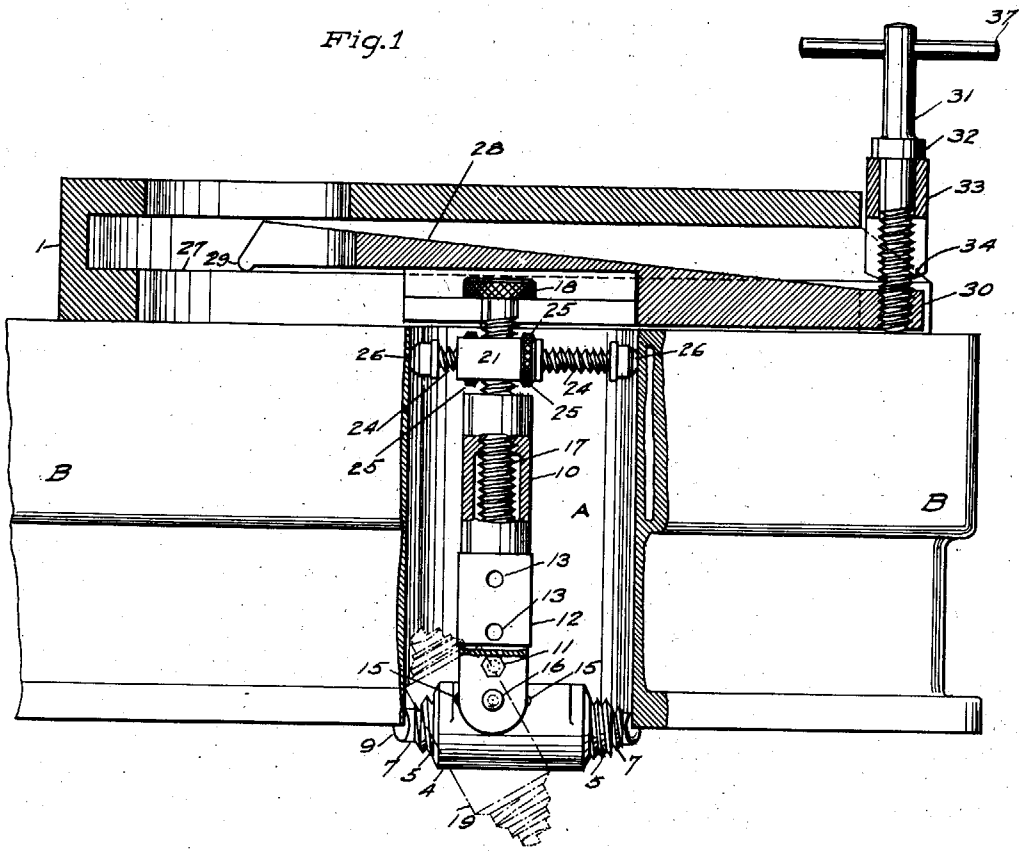
Figure 1 is a side elevation of the complete device, some parts being shown in section.
Figure 3:
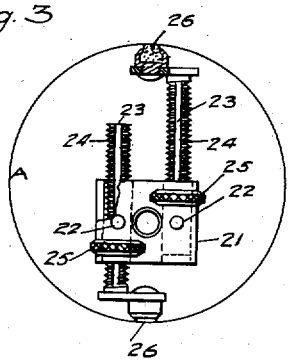
Figure 3 is a plan view of the adjusting device.
Figure 2:
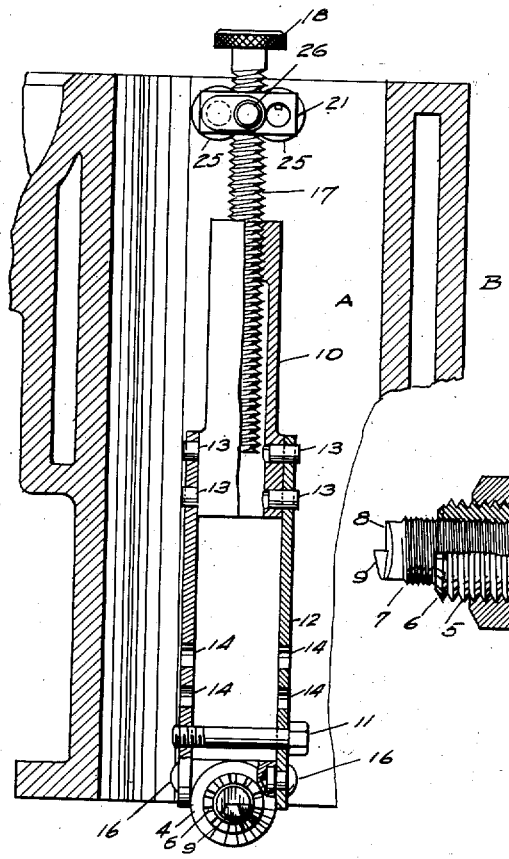
Figure 2 is partly another side elevation of the arm (at the left) and partly a section through the arm (at the right)
Figure 4:
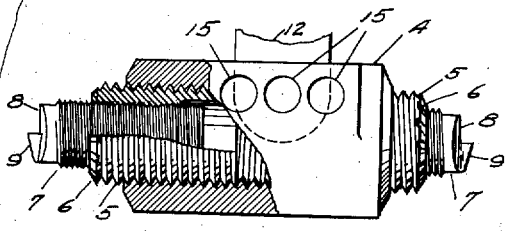
Figure 4 is partly an enlarged side elevation of the engaging device (at the right), and partly a section through the said device (at the left)

The principal part of the machine base 1, as best shown in Figures 6 and 7, Sheet 4, can be such as to provide suitable means of mounting the usual portable machine units thereto as provided in Figures 6 and 7. With the desired machine unit mounted on the machine base 1, the method of attaching the base 1 to any engine cylinder block for any of the aforesaid operations is substantially as follows:

The cylinder bore engaging arm as best shown in Figure 1, Sheet 1, and Figure 2, Sheet 2, is fitted to a cylinder bore A in an engine block B, preferably adjacent to the valve, stud, or cylinder bore to be worked on. The hinged body member 4, an enlarged view of which is shown in Figure 4, is internally threaded to receive the externally threaded sleeves 5, the sleeves 5 having notched ends 6 for ease of adjustment; sleeves 5 are also internally threaded to receive adjusting members 7 with cylinder engaging ends 8 and projections 9. Owing to the coarse thread on the sleeve 5 and the fine thread on the member 7, the ends 8 can be adjusted to the size of the cylinder bore. The extension member 10, Figure 1, Sheet 1, and Figure 2, Sheet 2, is used in two positions according to the length of the cylinder bore, one position as shown, and one may be obtained by loosening the screw 11 allowing the plates 12 to be removed from the pins 13 which are permanently secured in member 10 member 10 shown on Figure 2, Sheet 2, can now be moved so that pins 13 enter the holes 14 in the plates 12. The body member 4 of the engagement device is provided with pairs of holes 15, and the hinge pins 16 in the plates 12 can be inserted into any corresponding pair to form an offset of member 10 in relation to the axial line of the cylinder bore. The extension member 10 is internally threaded to receive a screw 17, which is provided with an attachment head 18: screw 17 also carries the adjustment device, Figure 3, Sheet 2, having a body block 21, adjustable to maintain the parts described in position in the cylinder bore as follows. The head 18 is grasped and the hinged member 4 swinging on the rivets 16 passes through the cylinder bore as indicated by the dotted line 19, Figure 1, Sheet 1, allowing the cylinder engaging projections 9 to engage the end of a cylinder bore as shown by the full lines. The attachment head 18 is adjusted to project the proper amount above the cylinder block B and the parts in the adjustment device Figure 3, Sheet 2, are adjusted by turning the body block 21 on the screw 17 to be below the surface of the cylinder bore. The knurled wheels 25 are now turned, causing adjustment screws 24 to move outwardly until tips 26, which are preferably made of fibrous material, come into engaging contact with the cylinder bore, screws 24 being kept from turning by keys 22 which act in keyways 23. The attachment head 18 is thus adjusted to any vertical position above the cylinder block.

Figure 5:
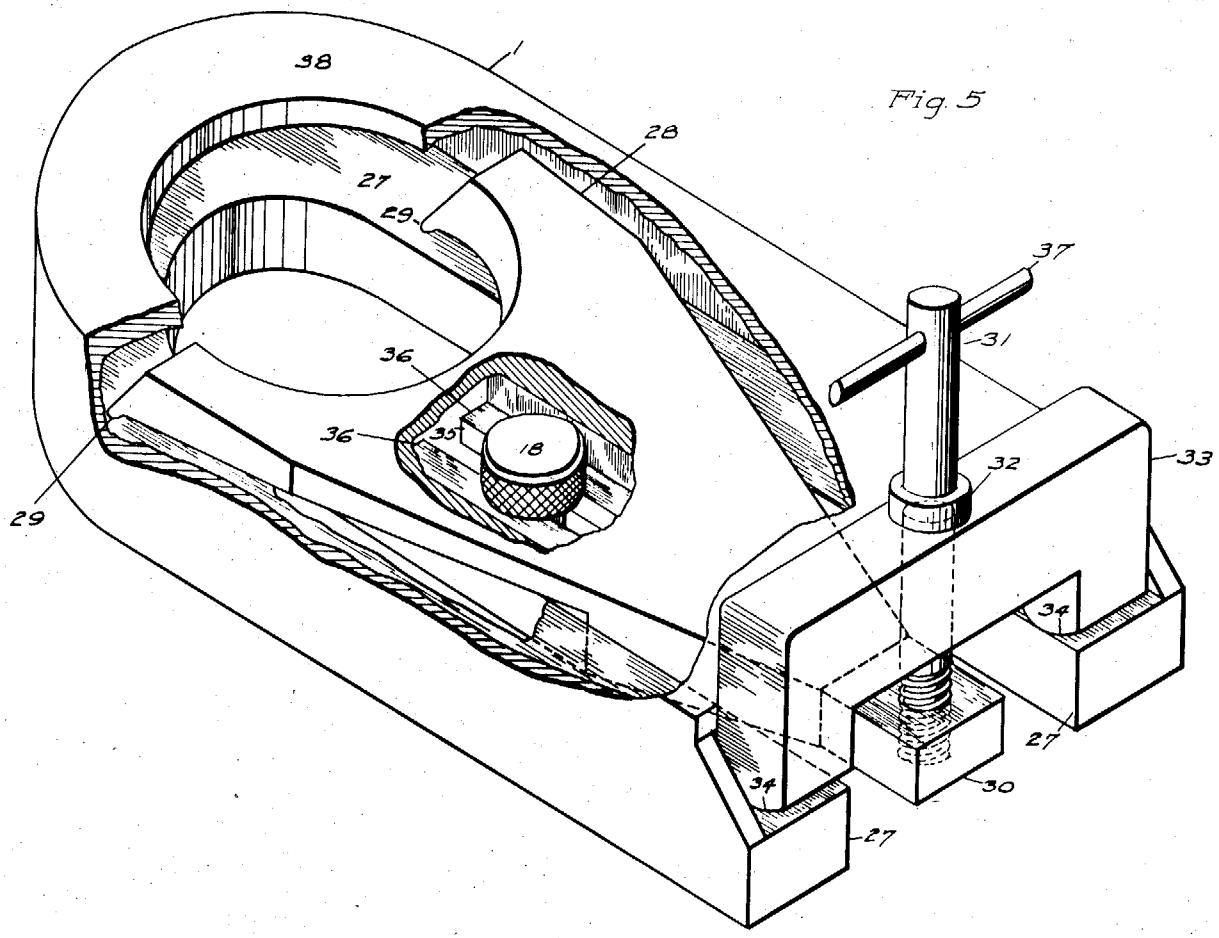
Figure 5 is an assembly view (partly sectional) of the sliding machine base.

The machine base 1 is placed in position for the work to be done, the attachment head 18 projecting into the opening formed by the inwardly projecting edges 27, the pressure member 28 as best shown in Figure 5, Sheet 3, is moved into the opening in base 1, the fingers 29 coming to rest on the inner end of edges 27, and the outer end 30 of the pressure member 28 hanging on the thread of screw 31 supported by its attached collar 32 on the bridge member 33, the abutments 34 of the bridge member 33 resting on the outer end of the edges 27 of the base 1. The two inwardly projecting edges 36 of the opening 35 in the pressure member 28 pass under the attachment head 18, and by turning the cross bar 37 fastened in screw 31 the end 30 of pressure member 28 is raised, causing a downward pressure on the abutments 34 and the fingers 29 by the lifting action of the screw 31 on the attachment head 18, resulting in a three-point pressure, which is transmitted by member 28 to the base 1 at four points, causing the firm attachment of base 1 to its work without distortions.

The foregoing has made it clear the opening 35 with its edges 36 in pressure member 28 together with the shifting action provided for the attachment head 18 allowing it to be positioned at different points in relation to the axial line of a cylinder bore, is the provisional construction to allow base 1 to be positioned properly for any desired operation; also, no extra provisions for attaching base 1 need be considered and the entire surface 38 adjacent to the mounted portable tool mechanism is left free and clear for the mounting of drive motors, centering devices, controls, etc., at a low and balanced point, such mounting being effected either by means of screw thread 3, Figure 6, or by means of studs 2, Figure 7. The actual attaching is accomplished at a point under this surface 38 by the action of the screw 31 at a point accessible.

Having thus described my invention, I claim as new, and desire to cover by Letters Patent:

1. A device for securing a tool to a multi-cylinder engine block, comprising a base adapted to rest upon the engine block and having a mounting for a tool, an anchor securable within a cylinder other than the one being worked upon, a pressure member having pivotal engagement intermediate its length with the anchor and having two-point engagement at one end with the base adjacent the tool mounting, a bridge straddling the pressure member at its other end and resting with a two-point contact upon the base, and means to draw the second end of the pressure member towards the bridge to press the bridge and the opposite end of the pressure member simultaneously against the base.

2. A device for securing a tool to a multi-cylinder engine block comprising a base adapted to rest upon the engine block and having a mounting for a tool, a member expansible within a cylinder other than the one being worked upon and having one or more projections engageable beneath the end of the cylinder wall to resist an upward pull, a headed anchor adjustably secured to said member so as to project above the top of the cylinder block, a slotted pressure member having ledges fitting under the anchor head to form a pivotal engagement therewith intermediate the length of the pressure member, said pressure member having two-point engagement at one end with the base adjacent the tool mounting, a bridge straddling the pressure member at its other end and resting with a two-point contact upon the base, and means to draw the second end of the pressure member towards the bridge to press the bridge and the opposite end of the pressure member simultaneously against the base.

3. A device for securing a tool to a multi-cylinder engine block or the like comprising an arm adapted to be passed through a cylinder bore, a member pivotally mounted at one end of the arm and having radially adjustable cylinder engaging devices and lugs to engage the end of the cylinder wall, an arm support secured to the arm and having cylinder wall engaging devices positioned to engage the wall of the cylinder at a point remote from said member and thereby to steady the arm, and a member carried by the arm in position to be grasped by the tool mounting.

4. A device for securing a tool in operative relation to a multi-cylinder engine block and the like comprising an arm adapted to pass through a cylinder other than the one being worked on, a member pivotally mounted at one end of the arm, a pair of abutments carried by the member and adjustable to the diameter of the cylinder wall near one end, lugs carried by said member adapted to engage under the end of the cylinder wall, said member with the lugs thereon being adapted to pass freely through the cylinder when it is tilted on its pivot, an anchoring device adjustably mounted on the arm and adapted to be engaged by a tool mounting, and a support having a plurality of adjustable cylinder wall engaging abutments associated with the anchoring device to steady it and align it within the cylinder wall.

5. In a machine for reboring the cylinders of internal combustion motors and the like, a tool carrying base adapted to be placed upon the cylinder block to bring the tool into alinement with the cylinder to be rebored, a member passable through a cylinder other than the one to be rebored and carrying an anchor by which said member may be secured against motion in said cylinder in the direction of the cylinder's axis, a head on the end of the member remote from the anchor and positioned above the top of the cylinder block, a device independent of the anchor for supporting the member in the cylinder, a lever having an open ended slot slidable laterally into pivotal connection with the member beneath the head thereon and bearing on the tool carrying base adjacent the cylinder to be rebored, and means positioned to engage the lever on the side of said member remote from the cylinder to be rebored to rock the lever about its point of pivotal engagement and thereby to cause it to clamp the base to the cylinder block in the region adjacent the cylinder to be rebored.

6. In a machine for reboring the cylinders of internal combustion motors and the like, a tool carrying base adapted to be placed upon the cylinder block to bring the tool into alignment with the cylinder to be rebored, a member passable through a cylinder other than the one to be rebored and carrying an anchor by which said member may be secured against upward motion in said cylinder, a device operable to limit the movement of the upper end of the member relative to the cylinder, a head located on the upper end of the member and held in a fixed position, at an elevation above the top of the cylinder block, a slide having an open ended slot movable laterally into operative engagement with the member beneath its head while the head is so held in position, and mechanism for exerting a leverage between said slide and the base to cause the base to be pressed firmly against the cylinder block.

EWALD A. ARP.